United States Patent
Kim

(10) Patent No.: US 11,331,173 B2
(45) Date of Patent: May 17, 2022

(54) METHOD OF MANUFACTURING DENTURE BY USING JIG

(71) Applicant: Yunsoon Kim, Duluth, GA (US)

(72) Inventor: Yunsoon Kim, Duluth, GA (US)

( * ) Notice: Subject to any disclaimer, the term of this patent is extended or adjusted under 35 U.S.C. 154(b) by 0 days.

(21) Appl. No.: 16/495,517

(22) PCT Filed: Apr. 9, 2019

(86) PCT No.: PCT/KR2019/004197
§ 371 (c)(1),
(2) Date: Sep. 19, 2019

(87) PCT Pub. No.: WO2020/175737
PCT Pub. Date: Sep. 3, 2020

(65) Prior Publication Data
US 2021/0378801 A1    Dec. 9, 2021

(30) Foreign Application Priority Data
Feb. 26, 2019    (KR) .................... 10-2019-0022710

(51) Int. Cl.
*A61C 13/10*    (2006.01)
*B33Y 80/00*    (2015.01)
*A61C 13/00*    (2006.01)

(52) U.S. Cl.
CPC ...... *A61C 13/1003* (2013.01); *A61C 13/0019* (2013.01); *B33Y 80/00* (2014.12)

(58) Field of Classification Search
CPC ............ A61C 13/0001; A61C 13/0004; A61C 13/0019; A61C 13/01; A61C 13/1003; A61C 13/1006; A61C 13/1016; A61C 13/102; B33Y 70/00; B33Y 80/00
USPC ........................................................ 433/199.1
See application file for complete search history.

(56) References Cited

U.S. PATENT DOCUMENTS

| | | | | |
|---|---|---|---|---|
| 10,874,490 B2 * | 12/2020 | Ruppert | ................. | A61C 13/00 |
| 2014/0087327 A1 * | 3/2014 | Noack | ................. | A61C 13/0022 |
| | | | | 433/50 |
| 2015/0066181 A1 * | 3/2015 | Beyer | ................. | A61C 13/0004 |
| | | | | 700/98 |
| 2015/0216638 A1 * | 8/2015 | Baaske | ............. | A61C 13/1016 |
| | | | | 433/199.1 |
| 2019/0090995 A1 * | 3/2019 | Ruppert | ................. | B29C 64/124 |
| 2021/0378801 A1 * | 12/2021 | Kim | ................. | A61C 13/1003 |
| 2021/0401551 A1 * | 12/2021 | Kim | ................ | B33Y 80/00 |

FOREIGN PATENT DOCUMENTS

| | | | | |
|---|---|---|---|---|
| JP | 6469865 B2 * | 2/2019 | ......... | A61C 13/0004 |
| KR | 20120054962 A * | 5/2012 | | |
| KR | 10-1682285 B1 | 12/2016 | | |
| KR | 10-1867040 B1 | 6/2018 | | |
| KR | 20180096453 A * | 8/2018 | | |

* cited by examiner

*Primary Examiner* — Matthew M Nelson
(74) *Attorney, Agent, or Firm* — Innovation Counsel LLP

(57) ABSTRACT

The present inventive concept relates to a method of manufacturing dentures by using a jig, the method including: planting false teeth in a soft jig to expose roots of the false teeth to outside of the soft jig; inserting the soft jig into a hole provided in a hard jig; cutting exposed portions of the false teeth to a depth set by a controller of a milling machine; and inserting the cut false teeth into a false teeth groove of a gum structure.

9 Claims, 4 Drawing Sheets

METHOD OF MANUFACTURING DENTURE BY USING JIG

CROSS-REFERENCE TO RELATED APPLICATIONS

This application claims priority to and the benefit of Korean Patent Application No. 10-2019-0022710, filed on Feb. 26, 2019 and PCT Application No PCT/KR2019/004197, filed on Apr. 9, 2019, the entire contents of which are incorporated herein by reference.

BACKGROUND

The present inventive concept relates generally to a method of manufacturing dentures by using a jig. More particularly, the present inventive concept relates to a method of manufacturing dentures by using a jig, wherein after an upper jaw shaped soft jig and/or a lower jaw-shaped soft jig in which false teeth are planted is inserted into and combined with a hard jig, each of roots of the false teeth is cut to the same depth as a depth of each of original teeth of a wearer thereof during milling, the false teeth are inserted into a gum structure so as to manufacture the dentures, whereby denture manufacturing is precise, convenient, quick, and economical.

Generally, a method of implanting false teeth when teeth in an oral cavity of a person are lost or damaged has been developed, and particularly, dentures using the false teeth have been efficiently developed along with the method of implanting. As a conventional technique on a method of manufacturing the dentures, there is disclosed an assembly type denture apparatus in Korean Patent No. 10-1867040, the apparatus including: a denture base having a corresponding groove part provided on a first end part thereof, the groove part corresponding to a surface profile of the gum object, such that false teeth prosthetic teeth are in close contact with and fixed to a surface of a gum object and having a combination protruding part provided on a second end part thereof so as to correspond to a dental arch line of the gum object; and a false teeth part having a masticatory surface provided on a second end part thereof, the masticatory surface corresponding to a tooth type by position of the dental arch line and having an insertion groove provided on a first end part thereof, the insertion groove into which the combination protruding part is inserted, so as to be combined with the second end part of the denture base, wherein an outer surface profile of the artificial teeth part, which has masticatory cross-sections by tooth types provided from a digital library, is set on the basis of virtual artificial teeth of a virtual dental template extracted according to a circular arc length of the dental arch line and an occlusion height up to an occlusion object from the gum object, wherein the virtual artificial teeth are provided to have a width and a height standardized according to the circular arc length and the occlusion height, the virtual artificial teeth having virtual insertion grooves provided therein, the insertion groove corresponding to each shape and volume thereof, and an outer surface profile of the combination protruding part is set so as to correspond to the virtual insertion grooves of the virtual artificial teeth.

In addition, in Korean Patent No. 10-1682285, there is disclosed a method of producing dentures, the false teeth having a base element supporting at least two tooth blanks, the method including: producing a negative mould by machining on the basis of a digital image of a tooth state; shortening, by machining, lengths of the tooth blanks, which are held and preassembled in the negative mould, from a basal side in order to achieve a tooth line suitable for the tooth state; and connecting the base element with the shortened tooth blanks so as to form the dentures.

However, a milling work for the conventional denture manufacturing is required to manufacture each of the false teeth according to each size thereof, whereby working speed is slow, manufacturing cost increases, and working precision decreases.

False teeth for dentures manufactured by 3D printing have low beauty and low strength, and are manufactured slowly, thereby being expensive to manufacture.

SUMMARY

Accordingly, the present inventive concept provides a method of manufacturing dentures by using a jig, wherein an upper/lower jaw-shaped soft jig in which false teeth are planted is inserted into and combined with a hard jig, and each of roots of the false teeth is cut to a depth designated by software of a controller during milling That is, each of the roots of the false teeth is cut to the same depth as a depth of each of original teeth of a wearer thereof. In this case, undercuts are provided in the vicinity of the roots so as to manufacture dentures so that the strength of combining the false teeth with a gum structure is excellent, whereby denture manufacturing is precise, convenient, quick, and economical.

In order to accomplish the above object, the present inventive concept provides a method of manufacturing dentures by using a jig, the method including: planting false teeth in an upper/lower jaw-shaped soft jig; inserting the soft jig into a hole provided in a middle of a hard jig; cutting each of roots of the false teeth to a depth set by a controller of a milling machine after placing the hard jig, in which the soft jig is combined therewith, in the milling machine; and inserting the cut false teeth into a false teeth groove of a gum structure.

Accordingly, according to the present inventive concept, after an upper/lower jaw-shaped soft jig in which false teeth are planted is inserted into and combined with a hard jig and each of roots of the false teeth is cut to the same depth as a depth of each of original teeth of a wearer thereof during milling, the false teeth are inserted into a gum structure so as to manufacture the dentures, whereby denture manufacturing is precise, convenient, quick, and economical, and beauty of the dentures is improved.

That is, instead of 3D printing or milling entirety of the false teeth, only roots of the false teeth are simply manufactured by using a jig, whereby manufacturing time is considerably reduced and thus manufacturing cost is significantly reduced.

DETAILED DESCRIPTION

The present inventive concept relates to a method of manufacturing dentures by using a jig, the method including: planting false teeth in an upper jaw-shaped soft jig and/or a lower jaw-shaped soft jig; inserting the soft jig into a hole provided in a middle of a hard jig; cutting each of roots of the false teeth to a depth set by a controller of a milling machine after placing the hard jig, in which the soft jig is combined therewith, in the milling machine; and inserting the cut false teeth into a false teeth groove of a gum structure.

In addition, while the roots of the false teeth are cut, undercuts are manufactured in a lower side of the roots of the false teeth.

Furthermore, the processed false teeth are inserted into the gum structure so as to be planted therein, wherein the false teeth are processed by milling or 3D printing and, at the same time, the false teeth groove in which the false teeth are planted are also processed by milling or 3D printing.

In addition, the soft jig of an arch shape includes a false teeth hole of an arch shape provided therein. Multiple false teeth may be inserted into the false teeth hole. Because every wearer of the false teeth has teeth of different sizes, the soft jig may be configured to have the same in appearance but a depth and a width of the false teeth hole in which the false teeth are planted may be different every wearer of the false teeth.

Additionally, after the multiple false teeth are inserted into the false teeth hole, a soft sealing material such as silicon is filled therein, so that the false teeth do not come out from the soft jig. The soft jig may be easily inserted into the hard jig and does not come out from the hard jig even during milling.

In addition, a size of each of upper jaw arches and/or lower jaw arches of the soft jig is different according to sizes of teeth.

Figure 1:
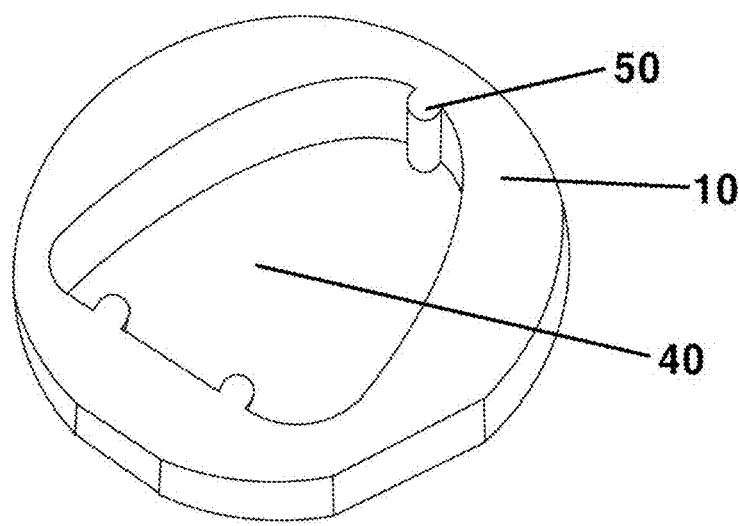
FIG. 1 is a perspective view of a hard jig of the present inventive concept.
Figure 2:
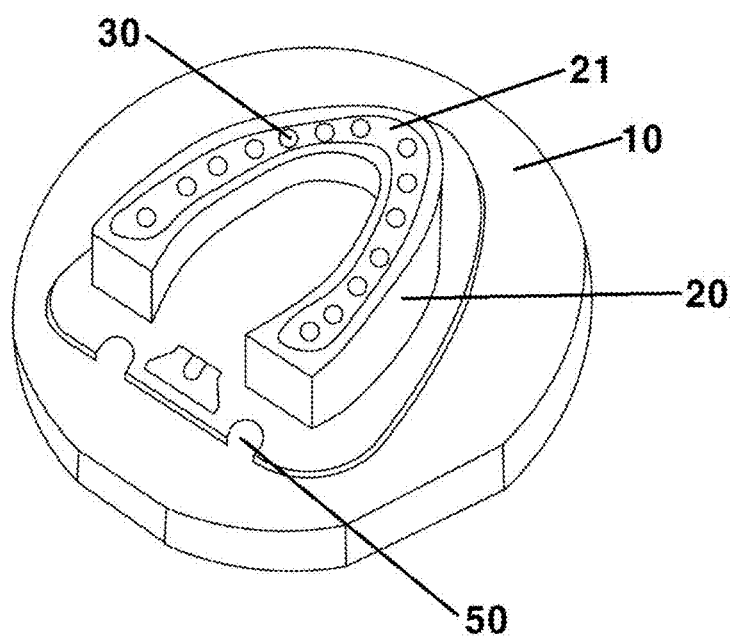
FIG. 2 is a perspective view of a soft jig being inserted into and combined with the hard jig of the present inventive concept.
Figure 3:
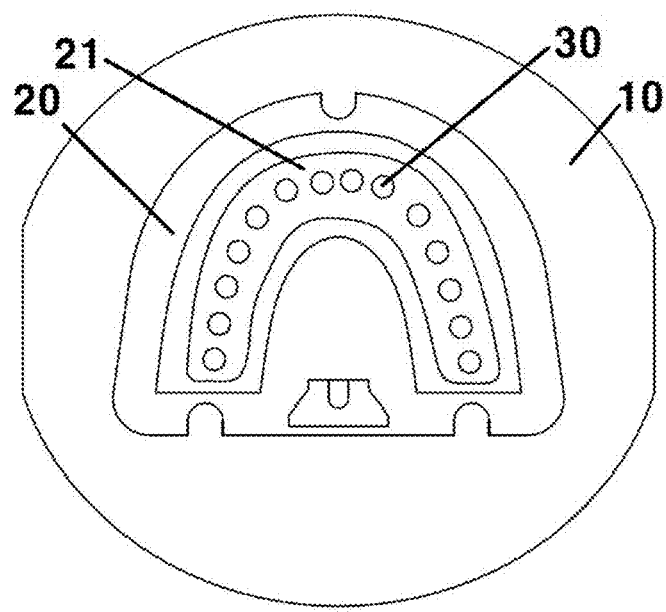
FIG. 3 is a top plan view of FIG. 2.
Figure 4:
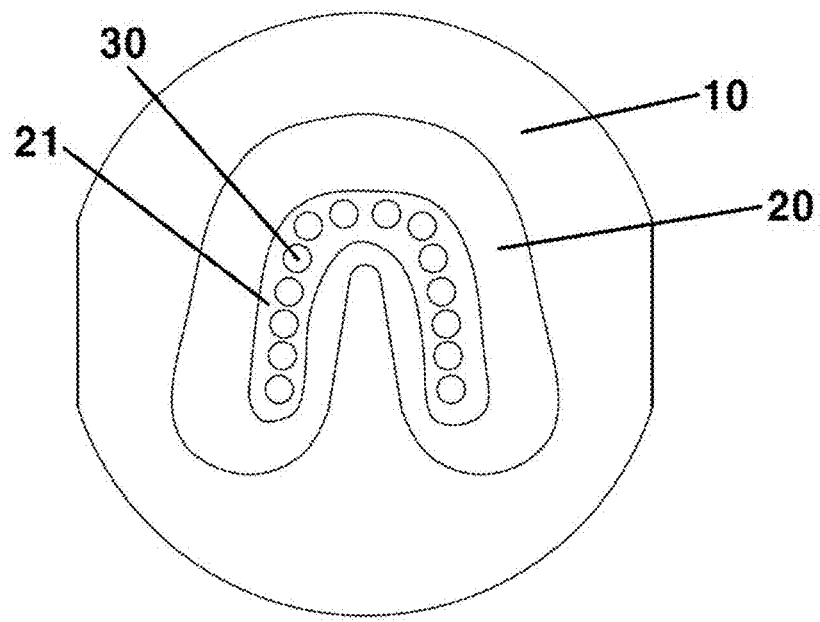
FIG. 4 is a view showing a state of false teeth of the present inventive concept inserted into a false teeth hole in the soft jig.
Figure 5:
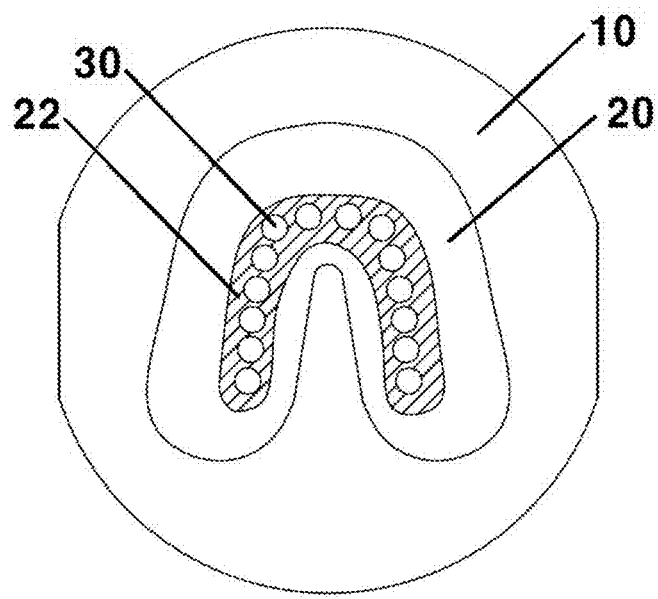
FIG. 5 is a view showing a state of a soft sealing material filled in the vicinity of the false teeth in the soft jig of the present inventive concept.
Figure 6:
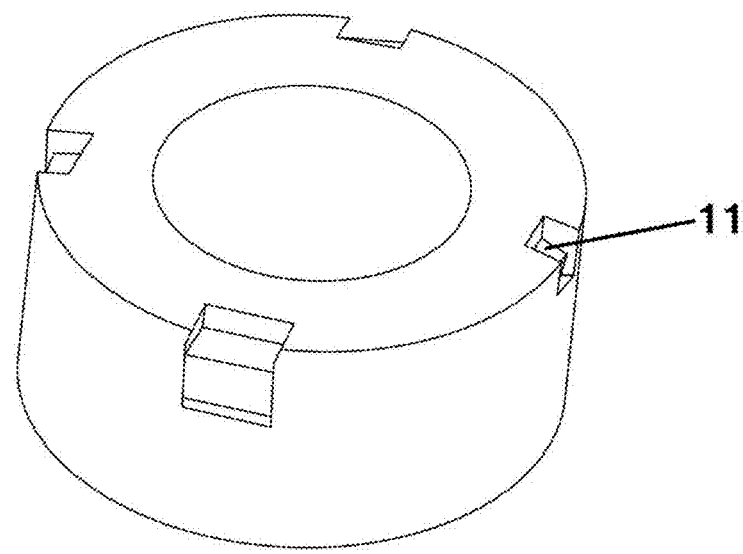
FIG. 6 is a perspective view of the hard jig of the present inventive concept, which includes holding indentations provided thereon.
Figure 7:
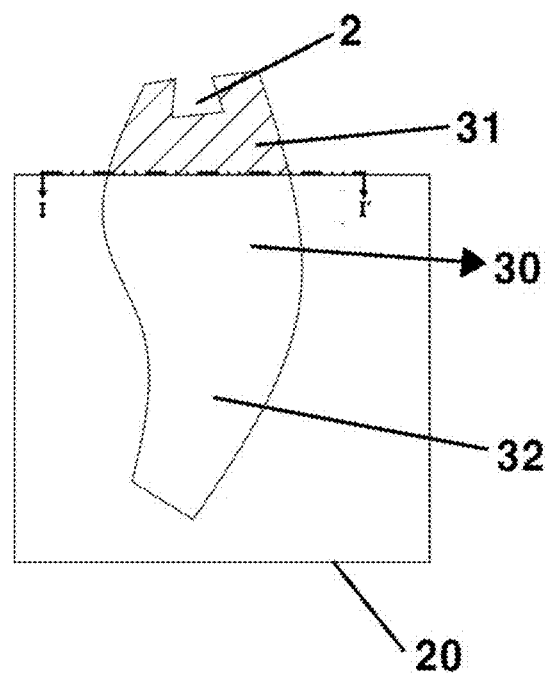
FIG. 7 is a view showing a state of the false teeth of the present inventive concept processed by being inserted into the soft jig.

The present inventive concept will be described in detail by the accompanying drawings as follows. FIG. 1 is a perspective view of the hard jig of the present inventive concept; FIG. 2 is a perspective view of the soft jig being inserted into and combined with the hard jig of the present inventive concept; FIG. 3 is a top plan view of FIG. 2; FIG. 4 is a view showing a state of the false teeth of the present inventive concept inserted into the false teeth hole in the soft jig; FIG. 5 is a view showing a state of a soft sealing material filled in the vicinity of the false teeth in the soft jig of the present inventive concept; FIG. 6 is a perspective view of the hard jig of the present inventive concept, which includes holding indentations 11 provided thereon; and FIG. 7 is a view showing a state of the false teeth of the present inventive concept processed by being inserted into the soft jig.

According to the present inventive concept, the false teeth are planted in an arch-shaped soft jig 20 imitating an upper jaw shape or a lower jaw shape. The soft jig 20, which is made of silicon, has elasticity and an arch shape. An false teeth hole 21 which has a small arch shape of an upper jaw shape or a lower jaw shape, is provided in the soft jig such that multiple false teeth 30 are planted in the false teeth hole 21. The false teeth 30 are planted into the soft jig 20. Root parts 31 of the false teeth 30 having an undercut 2 is exposed to outside of the soft jig 20 and end parts 32 of the false teeth 30 through which chew food is planted into the soft jig 20. This is intended to efficiently manufacture the root parts 31 and the undercuts in milling work which will be performed in a later process.

In addition, because every wearer of the false teeth has teeth of different sizes, even when the soft jig is configured to be the same in appearance, a depth and a width of the false teeth hole 21 in which the false teeth 30 are planted may vary on a person-to-person basis.

Particularly, the soft jig 20, in which the multiple false teeth 30 is configured to be planted, is firstly manufactured according to shapes and sizes of teeth, and false teeth 30 suitable for a shape and a size of the manufactured soft jig 20 are secondly selected and planted in the soft jig 20 so as to complete manufacturing of the soft jig 20 in which the multiple false teeth are planted. In this case, because the soft jig 20 surrounds entirety of the false teeth 30, the soft jig 20 prevents the false teeth 30 from coming out from the soft jig 20, is allowed to be easily inserted into the hard jig 10 at a later process and prevents positions of the false teeth from being altered even during milling.

Furthermore, according to another embodiment, after multiple false teeth are inserted into a false teeth hole 21, a soft sealing material 21 such as silicon is filled in an empty space between the false teeth hole 21 and the false teeth 30 such that the false teeth do not come out from the soft jig 20 even during milling.

Next, the soft jig 20 is inserted into the hole 40 in the middle of the hard jig 10 and combined with the hard jig 10, and the hard jig 10 having a shape of a round plate in appearance includes the hole 40 in the middle of it and is made of PET, plastic or iron. The hole 40 in the middle of the hard jig 10 has a shape such that the soft jig 20 of an arch shape is easily inserted into the hole 40 and fits into the hole 40. Each of opposite sides of the hole 40 has the same arch shape as the arch shape of the soft jig 20. The hard jig 10 includes multiple guiding protrusions 50 provided on its inner walls. The guiding protrusions 50 is protruded from an inner wall of the hard jig 10 toward a center portion of the hole 40 such that the upper jaw-shaped soft jig or a lower jaw-shaped soft jig 20 is fitted into and fixed to the guiding protrusions 50.

The soft jig 20 includes multiple guiding grooves 50 recessed in directions toward its center portion from outer edges thereof so as to correspond to the multiple guiding protrusions 50 of the hard jig 10.

Next, the soft jig 20 combined with the hard jig 10 is arranged on the milling machine and the milling work is performed. In this case, each of the roots of the false teeth 31 provided in the soft jig 20 is cut to a depth set by a software of a controller of the milling machine along a line I-I' in FIG. 7. That is, each of the roots 31 of the false teeth 30 may be cut to the same height and size as a height and a size of each of original teeth of a wearer.

Finally, the processed false teeth, the hatched portion of the false teeth 31 in FIG. 7, are inserted into and planted in the gum structure so as to complete the dentures.

A material of the gum structure of the present inventive concept is polymethyl methacrylate (PMMA) or nylon and uses color similar to pink color, and may use darker or lighter color according to brightness desired. The gum structure is manufactured by milling or 3D printing, and in this case, the false teeth groove in which the false teeth are planted are also processed at the same time by milling or 3D printing. In this case, the undercuts 2 are provided in the vicinity of the roots so as to manufacture dentures, whereby a strength to which the false teeth are combined with the gum structure by an adhesive such as a bond is excellent and denture manufacturing is precise, convenient, quick, and economical.

Accordingly, according to the present inventive concept, after the upper/lower jaw-shaped soft jig in which false teeth are planted is inserted into and combined with the hard jig and each of roots of the false teeth is cut to the same depth as a depth of each of original teeth of a wearer thereof during the milling work, the false teeth are inserted into the gum structure so as to manufacture the dentures, whereby denture manufacturing is precise, convenient, quick, and economical.

The invention claimed is:

1. A method of manufacturing dentures by using a jig, the method comprising:
   planting false teeth in a soft jig to expose roots of the false teeth to outside of the soft jig;
   inserting the soft jig into a hole provided in a hard jig;
   cutting exposed portions of the false teeth to a depth set by a controller of a milling machine; and
   inserting the cut false teeth into a false teeth groove of a gum structure.

2. The method of claim 1, further comprising: preparing the gum structure in which a false teeth groove are formed, the gum structure being formed by milling or 3D printing.

3. The method of claim 2, wherein, before the planting the false teeth in the soft jig, the soft jig is manufactured to correspond to shapes and sizes of the false teeth, the false teeth suitable for a shape and a size of the manufactured soft jig are selected and planted in the soft jig.

4. The method of claim 1, wherein the soft jig including a false teeth hole disposed in the soft jig, and
   wherein the method further comprising:
   filling a soft sealing material in an empty space between the false teeth hole and the false teeth before inserting the soft jig into the hole provided in the hard jig.

5. The method of claim 1, wherein the soft jig and the soft sealing material is formed of a same material.

6. The method of claim 1, wherein the soft jig and the soft sealing material is silicon.

7. The method of claim 1, wherein the hard jig includes guiding protrusions which is protruded from an inner wall of the hard jig toward a center portion of the hole.

8. The method of claim 1, wherein the soft jig includes guiding grooves recessed in directions toward its center portion from outer edges to correspond to the guiding protrusions of the hard jig.

9. The method of claim 1, wherein each of the false teeth includes an undercut recessed from a root part.

* * * * *